(12) United States Patent
McClary et al.

(10) Patent No.: US 10,019,473 B2
(45) Date of Patent: Jul. 10, 2018

(54) ACCESSING AN EXTERNAL TABLE IN PARALLEL TO EXECUTE A QUERY

(71) Applicant: Oracle International Corporation, Redwood Shores, CA (US)

(72) Inventors: Daniel McClary, Redwood Shores, CA (US); Allen Brumm, Foster City, CA (US); James Stenoish, San Francisco, CA (US); Robert K. Abbott, Andover, MA (US)

(73) Assignee: Oracle International Corporation, Redwood Shores, CA (US)

( * ) Notice: Subject to any disclaimer, the term of this patent is extended or adjusted under 35 U.S.C. 154(b) by 235 days.

(21) Appl. No.: 14/685,840

(22) Filed: Apr. 14, 2015

(65) Prior Publication Data

US 2015/0356131 A1  Dec. 10, 2015

Related U.S. Application Data

(60) Provisional application No. 62/009,836, filed on Jun. 9, 2014.

(51) Int. Cl.
*G06F 17/30* (2006.01)

(52) U.S. Cl.
CPC .. *G06F 17/30339* (2013.01); *G06F 17/30424* (2013.01); *G06F 17/30445* (2013.01)

(58) Field of Classification Search
CPC ......... G06F 17/30339; G06F 17/30424; G06F 17/30445
See application file for complete search history.

(56) References Cited

U.S. PATENT DOCUMENTS

| | | | | |
|---|---|---|---|---|
| 5,870,743 A | * | 2/1999 | Cohen | G06F 17/30445 |
| 6,282,039 B1 | | 8/2001 | Bartett | |
| 7,293,011 B1 | * | 11/2007 | Bedi | G06F 17/30445 |
| 8,019,778 B2 | * | 9/2011 | Niina | G06F 17/30463 |
| | | | | 707/770 |
| 8,543,554 B1 | | 9/2013 | Singh et al. | |
| 8,903,846 B2 | * | 12/2014 | Srivastava | G06F 17/30342 |
| | | | | 707/769 |

(Continued)

OTHER PUBLICATIONS

Xiaoxia Huang, "Design and Implementation of a Cache-based Granular Computing System" ISKE 2007, Proceedings, dated Oct. 15, 2007, 6 pages.

(Continued)

*Primary Examiner* — Leslie Wong
(74) *Attorney, Agent, or Firm* — Hickman Palermo Becker Bingham LLP

(57) ABSTRACT

An approach, referred to herein as parallelized-external-table access, generates rows from a single external table in parallel for a given query. Under parallelized-external-table access, an execution plan generated for the query includes multiple work granules that generate rows for a single external table from a data source. Such work granules are referred to herein as external work granules. Each external work granule of the execution plan may be assigned to a slave process, which executes the external work granule in parallel with another slave process executing another external work granule. External tables are accessible on a cluster of data nodes in a distributed data access system (e.g. Hadoop Distributed File System) connected to a DBMS.

14 Claims, 10 Drawing Sheets

(56) References Cited

U.S. PATENT DOCUMENTS

| | | |
|---|---|---|
| 2003/0065826 A1 | 4/2003 | Skufca et al. |
| 2003/0105928 A1 | 6/2003 | Ash |
| 2005/0131881 A1* | 6/2005 | Ghosh ............... G06F 17/30445 |
| 2006/0026154 A1 | 2/2006 | Altinel et al. |
| 2007/0239791 A1 | 10/2007 | Cattell et al. |
| 2009/0037512 A1 | 2/2009 | Barsness |
| 2009/0049013 A1 | 2/2009 | Kumbi et al. |
| 2011/0314047 A1 | 12/2011 | Koronthaly et al. |
| 2012/0087947 A1 | 4/2012 | Sanchez |
| 2012/0219023 A1 | 8/2012 | Cahill et al. |
| 2012/0310916 A1* | 12/2012 | Abadi ............... G06F 17/30445 707/713 |
| 2012/0323947 A1 | 12/2012 | Bice |
| 2013/0091094 A1* | 4/2013 | Nelke ............... G06F 17/30315 707/610 |
| 2014/0201478 A1 | 7/2014 | Gunda et al. |
| 2014/0222777 A1 | 8/2014 | Creamer et al. |
| 2014/0258300 A1* | 9/2014 | Baeumges ........ G06F 17/30339 707/737 |
| 2014/0317084 A1 | 10/2014 | Chaudhry et al. |
| 2015/0254257 A1 | 9/2015 | Kritchko |
| 2015/0356158 A1 | 12/2015 | Potapov et al. |
| 2016/0147833 A1 | 5/2016 | Chaudhry et al. |
| 2016/0196530 A1 | 7/2016 | Staffin |

OTHER PUBLICATIONS

Harder, Theo, "DBMS Architecture—New Challenges Ahead", Datebank-Specktum, Ohsu Digital Commons, dated Jan. 1, 2005, 12 pages.

U.S. Appl. No. 13/866,866, filed Apr. 19, 2013, Office Action dated May 18, 2015.

U.S. Appl. No. 13/866,866, filed Apr. 19, 2013, Notice of Allowance dated Sep. 11, 2015.

U.S. Appl. No. 15/012,742, filed Feb. 1, 2016, Office Action dated Sep. 13, 2016.

U.S. Appl. No. 15/012,742, filed Feb. 1, 2016, Interview Summary, dated Dec. 5, 2016.

Chaudhry, U.S. Appl. No. 15/012,742, filed Feb. 1, 2016, Final Office Action, dated Jan. 30, 2017.

Potapov, U.S. Appl. No. 14/733,691, filed Jun. 8, 2015, Office Action, dated Jul. 28, 2017.

Chaudhry, U.S. Appl. No. 15/012,742, filed Feb. 1, 2016, Notice of Allowance, dated Apr. 11, 2017.

Potapov, U.S. Appl. No. 14/733,691, filed Jun. 8, 2015, Interview Summary, dated Oct. 27, 2017.

Potapov, U.S. Appl. No. 14/733,691, filed Jun. 8, 2015, Final Office Action, dated Dec. 13, 2017.

\* cited by examiner

DDL statement 401

```
CREATE TABLE customer_address
(ca_customer_Id number(10,0)
, ca_street number char(10)
, ca_state char(2)
, ca_zip char(10)
)
ORGANIZATION EXTERNAL (
TYPE DDAS_TABLE
ACCESS PARAMETERS (DDAS: Distributed_File_System_104,
                   COLMAP: "ca_zip" "postal_code")
LOCATION ('customer_address')
)
```

FIG. 4

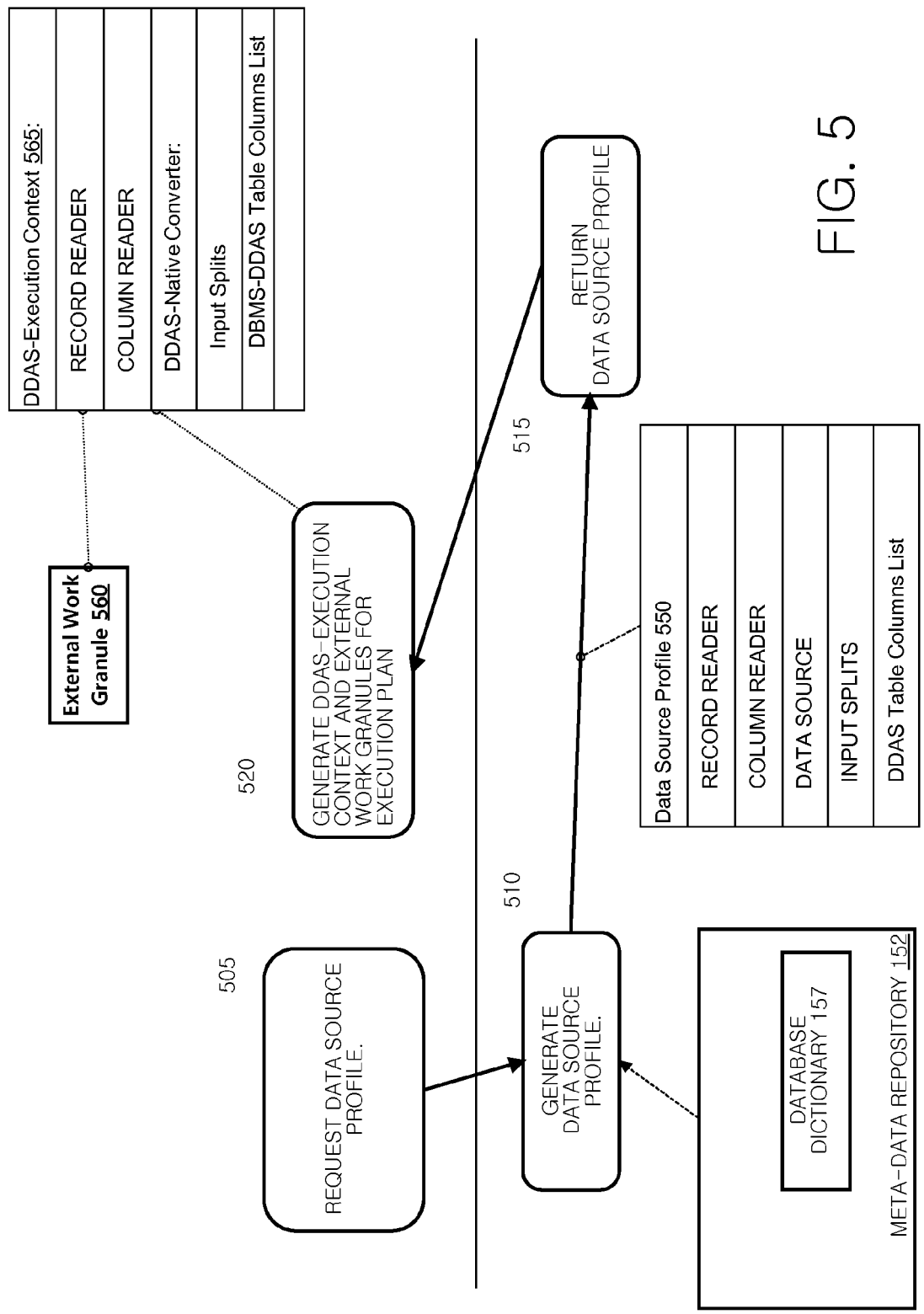

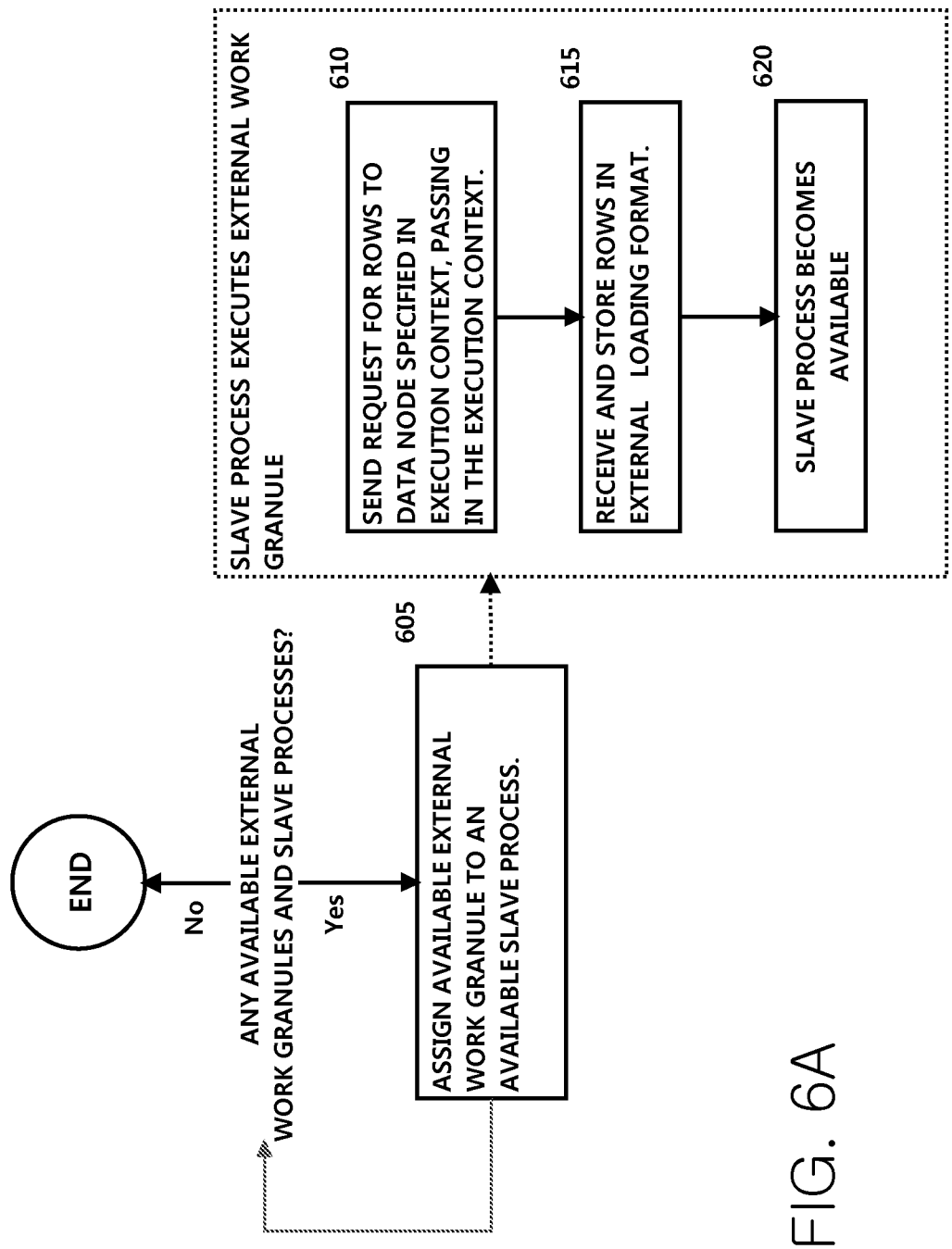

DDL statement 701

```
CREATE TABLE shipping_address
(sh_customer_Idnumber(10,0)
, sh_street_number char(10)
, sh_state      char(2)
, ca_zip    char(10)
)
ORGANIZATION EXTERNAL (
TYPE DDAS_FILE
ACCESS PARAMETERS (DDAS: DDAS_104,
                   COLUMN_READER: DDAS_104.ext_tab_lib.ShASer
                   RECORD_READER: DDAS_104.ext_tab_lib.ShAOutput
DDAS_NATIVE_CONVERTER: DDAS_104.ext_tab_lib.ORA_ELF)
LOCATION ('DDAS:/DDAS_104'/'shippingAddresses.json')
)
```

FIG. 7

ACCESSING AN EXTERNAL TABLE IN PARALLEL TO EXECUTE A QUERY

RELATED APPLICATIONS

The present application claims priority to U.S. Provisional Application No. 62/009,836, entitled External Tables For Distributed Files, filed by Dmitry Potapov, et al. on Jun. 6, 2014, the contents of which are incorporated herein by reference.

FIELD OF THE INVENTION

Embodiments of the present invention relate to parallel processing of database statements that access external tables.

BACKGROUND

Many Database Managements Systems (DBMS) are multi-node systems. Multi-node systems comprise multiple computing nodes, where each node may contain multiple processors, each running multiple concurrent processes. To fully utilize the computing power of a multi-node system, a DBMS may divide the task of executing a query into smaller subtasks, which may then be distributed to multiple processes running on one or more computing nodes. Because the subtasks are being performed in parallel by multiple processes which may be on multiple nodes, the execution of the query can be completed much faster than if the processing were performed by a single process.

A task that is divided into smaller subtasks that are executed by multiple processes is referred to herein as a distributed operation; each subtask may be referred to herein as a work granule. A DBMS typically executes a query as a distributed operation.

To execute a query as a distributed operation, the database server generates an execution plan and then executes the execution plan. An execution plan defines operations to be performed to execute a query and an order for performing the operations. Such operations are referred to herein as plan operations.

The execution plan divides many kinds of plan operations into work granules. When an execution plan is executed, each work granule is assigned to a "slave process" operating under control of a DBMS; some if not many of the work granules are performed in parallel by multiple slave processes.

Not all plan operations are divided into multiple work granules. One such plan operation is the generation of rows from an external table.

External Tables and Table Spaces

Database data may be stored in one or more files that belong to a table space. A table space is set of one or more files, or one or more portions of a file, or combination thereof, that is used to store data for a database, such as data for a table or an index. Files in a table space are formatted in a format native to a DBMS. A database dictionary of a DBMS defines table spaces and which table space files or portions thereof store data for which database objects.

Data for a database table may also be stored in external data sources, such as an external file. Data in an external data source is not formatted in a format native to a DBMS. A database table having data stored in an external data source, such as an external file, is referred to an external table.

A DBMS may define an external table in response to receiving a DDL (Data Definition Language) statement that describes the external table. The DDL statement specifies one or more columns for the external table ("DBMS table columns") and a data source of the external table, such as a file. Defining an external table creates external table metadata, which is stored in a database dictionary but does not define a portion of a table space for storing data for the external table.

Parallizing Table Scans

Execution plans may include work granules that retrieve data for a table by accessing a table space file, and in the case of an external table, an external data source, such as an external file. To access data for a table in a table space file, a DBMS may form an execution plan that may include multiple work granules that each access a different portion of a table space file. For an external data source, an execution plan does not include a work granule for generating rows from the external data source that can be executed in parallel with another work granule for generating rows for the external data source. As a result, the degree of parallelism that can be achieved for a query that references or otherwise requires access to an external table is hampered.

Described herein are techniques for forming execution plans with multiple work granules that access an external data source for an external table.

BRIEF DESCRIPTION OF THE DRAWINGS

In the drawings:

FIG. 4 depicts a DDL statement used for defining an external table according to an embodiment of the present invention.

FIG. 5 is a diagram depicting operations performed during compile time for a query requiring access to an external table according to an embodiment of the present invention.

FIG. 6A is a flowchart depicting operations performed by a DBMS to execute external work granules under parallelized-external-table access according to an embodiment of the present invention.

FIG. 7 depicts a DDL statement used for defining an external table according to an embodiment of the present invention.

DESCRIPTION OF EXAMPLE EMBODIMENTS

Overview

Described herein is an approach for generating rows from a single external table in parallel for a given query. The approach is referred to herein as parallelized-external-table access. Under parallelized-external-table access, an execution plan generated for the query includes multiple work granules that generate rows for a single external table from a data source. Such work granules are referred to herein as external work granules. Each external work granule of the execution plan may be assigned to a slave process, which executes the external work granule in parallel with another slave process executing another external work granule.

According to an embodiment, data sources for external tables are accessible on a cluster of data nodes in a distributed data access system connected to a DBMS. An example of a distributed data access system is a Hadoop Distributed File System. Each external work granule in an execution plan is executed, at least in part, by a data node, which returns rows for the external table to the DBMS.

Access to a data source is distributed across the data nodes; generally, a portion of the data source may be accessed only, or at least more efficiently, by a particular data node. When generating the execution plan, the distributed data access system supplies the DBMS with information that specifies each portion of the data source, and specifies which data node to use to access the portion. For a particular portion of the data source, the DBMS forms an external work granule to generate rows from the respective data node specified for that portion. For each external work granule, the DBMS requests that the respective data node execute the external work granule.

In addition, the format of the data sources is heterogeneous. For each format, different code modules (e.g. Java classes) may be used to generate rows for an external table. When generating the execution plan, the DBMS determines the particular code modules needed to generate rows for the external table. When a DBMS requests that a data node execute the external work granule, the DBMS also specifies which code modules to execute to generate the rows. Information about which code modules to execute may be supplied by the distributed data access system.

Illustrative External-DDAS System

Figure 1:
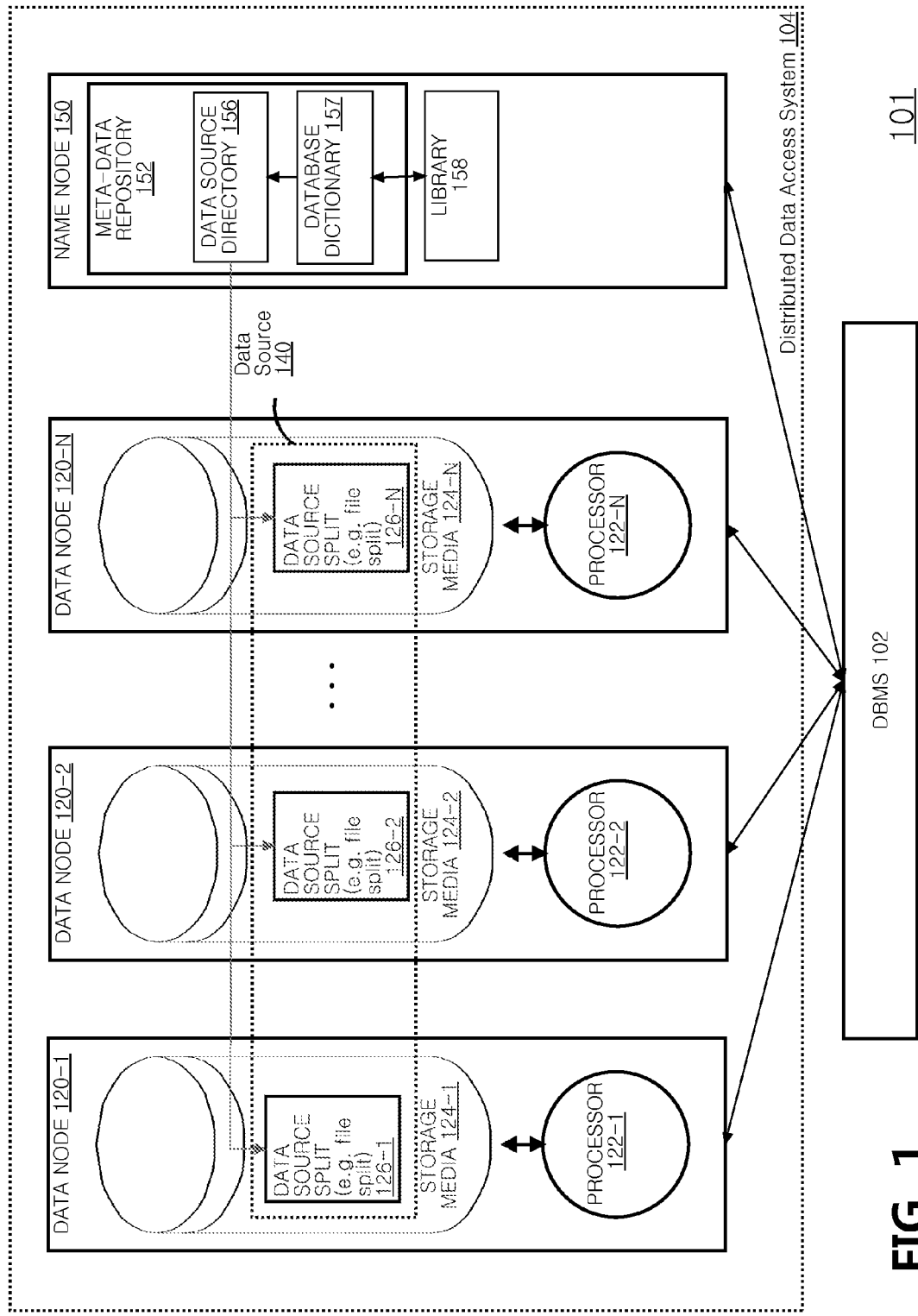
FIG. 1 is a diagram depicting a DBMS and distributed data access system enabled for parallelized-external-table access.

FIG. 1 is a diagram that depicts a DBMS and distributed data access system enabled for parallelized-external-table access, according to an embodiment of the present invention. Referring to FIG. 1, DBMS 102 comprises one or more database servers (not shown) and storage devices (not shown) for storing database data.

DBMS 102 is coupled over a network connection to Distributed Data Access System 104. DBMS 102 is configured to retrieve data for external tables from data nodes of Distributed Data Access System 104, the data nodes generating the data from a data source to which access is distributed across data nodes. An example of such a data source is a file stored across multiple data nodes.

A distributed data access system comprises at least two types of nodes, a data node, and a name node. A data node in a distributed data access system is responsible for generating data from a specified portion of a data source, the portion being referred to herein as a data source split. For example, a data source may be a file that is stored within a distributed data access system across multiple data nodes, each of the data nodes storing a separate portion of the file. The separate portion is referred to herein as a file split of the file. The combination of a data source split and the data node that is responsible for generating data from data source split is referred to herein as an input split.

A name node tracks and provides information about data sources and the input splits for the data sources within a distributed data access system. Specifically, a name node stores metadata about each data source within a distributed data access system, which may include, for each data source, the input splits for the data source, and for each input split, a data source split and a data node in the distributed data access system that produces data for the input split. In addition, the name node provides an interface through which a client of a distributed data access system, such DBMS 102, may request data specifying input splits for a data source.

Data nodes are the workers of a distributed data access system. A primary purpose of the data nodes is to perform a task requested by a client in parallel with other data nodes. The task involves generating data from a data source; each data node performs a task on a data source split of the data source. A task performed on a data source split by a data node is referred to herein as a split task. Each data node performs a split task on a data source split in parallel with other data nodes performing the task on a respective data source split.

To execute a task on a data source in a distributed data access system, a client requests the inputs splits for the data source from the name node, and sends a request to the data node of each input split to perform a split task on the respective data source split. The request specifies which code modules to use to perform the split task, as shall be explained in greater detail.

FIG. 1 depicts Distributed Data Access System 104 according to an embodiment. Distributed Data Access System 104 comprises Data Node 120-1, Data Node 120-2 and Data Node 120-N, as well as other nodes not depicted. Each data node in Distributed Data Access System 104 comprises storage media and one or more processors for processing data stored on the storage media. Storage media may be any form of memory for storing data, including volatile memory, such as DRAM, or non-volatile memory, such as disk storage, flash storage, or PRAM (persistent random access memory). Data Node 120-1 comprises storage media 124-1 and processor 122-1, Data Node 120-2 comprises storage media 124-2 and processor 122-2, and Data Node 120-N comprises storage media 124-N and processor node 122-N.

The data source splits of a data source in Distributed Data Access System 104 may be stored across the storage media of multiple data nodes. Data Source 140 comprises three data source splits each being stored on a separate data node. Data source split 126-1 is stored in Data Node 120-1, data source split 126-2 in Data Node 120-2, and data source split 126-N in Data Node 120-N. For example, Data Source 140 may be a file comprising file splits. A file split is stored in Data Node 120-1, a file split is stored in Data Node 120-2, and a file split is stored in Data Node 120-N.

A single file stored across data nodes has been described as an example of a data source, however, an embodiment of an invention is not limited to a data source that is a single file stored across data nodes. A data source may include multiple files accessible to the data nodes via a network. One data source split for the data source may be a file split of one file, another data source split may be a file split of another file. As another example, a data source may be a table stored in a DBMS accessible to the data nodes via a network; a data source split for an input split could be a set rows in a table.

Library

Distributed Data Access System 104 includes Library 158. Library 158 stores code modules executable by data nodes to perform a task requested by a client of Distributed Data Access System 104. In general, when a client requests Distributed Data Access System 104 to perform a task for execution by data nodes in Distributed Data Access System 104, a client sends a requests to each data node to perform a split task on the data source split. When a client sends such a request to a data node, the client specifies which code modules to execute to perform the task. A data node retrieves the specified code modules from Library 158, as shall be explained in greater detail.

Library 158 is depicted as being stored in Name Node 150. However, the library may be stored on any node within Distributed Data Access System 104, and/or copies of code modules may be distributed among multiple nodes within Distributed Data Access System 104.

In an embodiment, code modules in Library 158 comprise byte code compiled from an object-oriented language that may be executed on a virtual machine configured to execute byte code. For example, Library 158 may comprise compiled Java classes. However, code modules in Library 158 may comprise compiled or un-compiled code generated using any computer language. An embodiment of the present invention is not limited to any particular computer language.

Code modules in Library 158 conform to an API ("Application Program Interface") established for Distributed Data Access System 104, hereafter referred to as the DDAS API. The DDAS API defines a set of classes, class methods, routines and arguments thereof for code modules executable by nodes in Distributed Data Access System 104 to perform a task on a data source. By developing code modules that conform to the DDAS API, developers develop customized code modules that may be deployed and executed within Distributed Data Access System 104. An example of such a customized code module includes a Java class configured to read data from a file split of a file having a particular format and generate output from the data read in the form of records. An example DDAS API is the MAP Reduce API for the Hadoop Distributed File System.

Name Node

Distributed Data Access System 104 includes a Name Node 150. Name Node 150 comprises Meta-Data Repository 152, which stores meta-data describing and defining various aspects of Distributed Data Access System 104.

Meta-Data Repository 152 comprises a data source directory 156 and database dictionary 157. Data source directory 156 stores meta-data about data sources accessible within Distributed Data Access System 104.

Distributed Data Access System 104 provides DBMS-like capabilities, including the ability to define tables and query the tables using a database query language, such as SQL. To define the tables, a Meta-Data Repository 152 includes database dictionary 157, which stores meta-data defining the tables. Specifically, for each of the tables, database dictionary 157 defines one or more columns, data types thereof, one or more data sources to access data for a table, and code modules that are executed to generate records from the data sources and to generate columns for the records. A table defined by Distributed Data Access System 104 is referred to herein as a DDAS table. The column data types that may be defined by Distributed Data Access System 104 are referred to herein as DDAS column data types. The column data types that may be defined by a DBMS are referred to herein as DBMS column data types.

Elements used During Query Run-Time

As mentioned before, parallelized-external-table access entails several phases, some of which are performed as part of larger more comprehensive operations and phases undertaken to execute a database statement in general. The first of the several phases is the External Table Registration phase, which defines various aspects of an external table, including aspects related to generating rows for the external table from a distributed data access system.

Figure 2A:
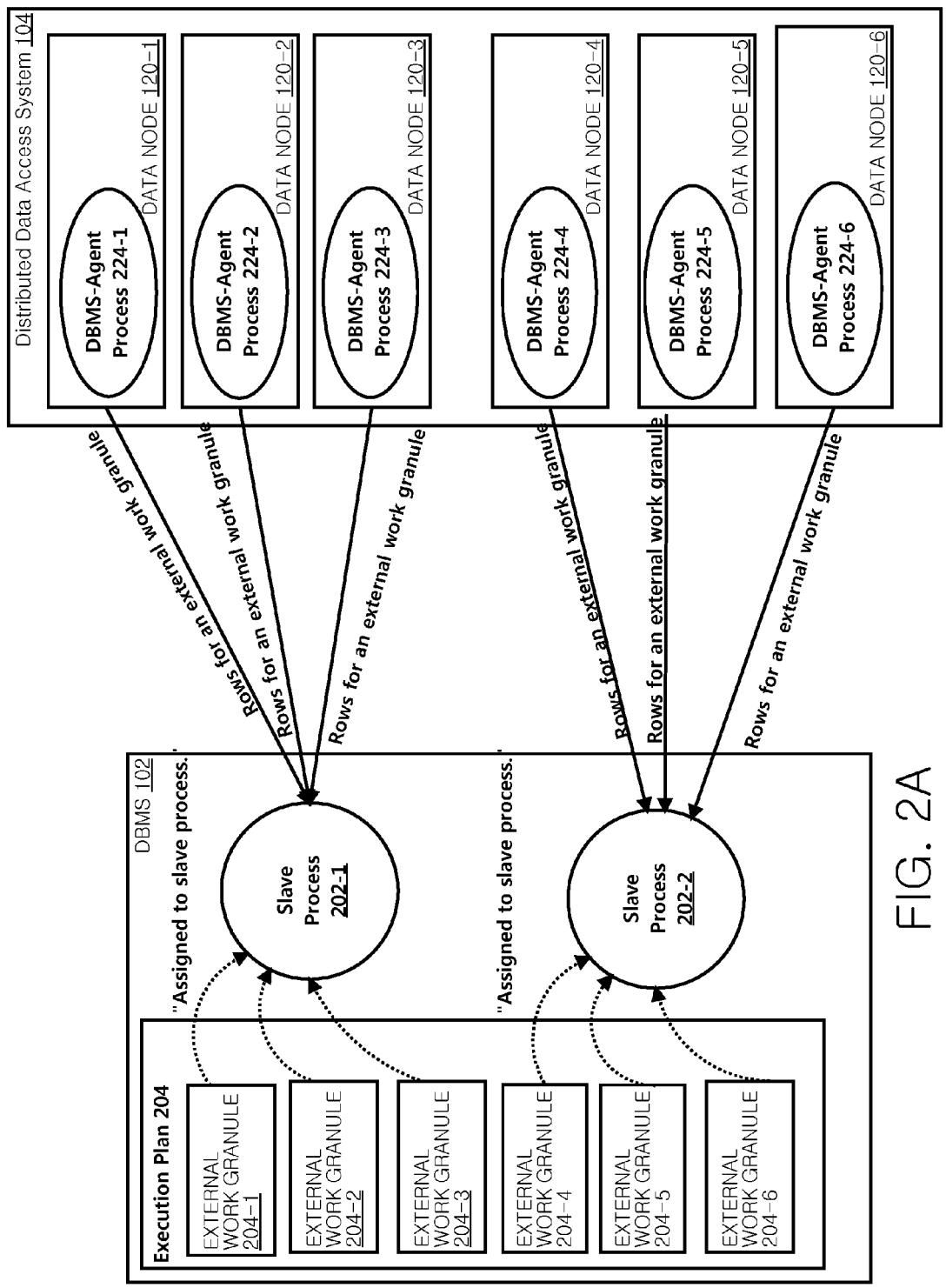
FIG. 2A is a diagram that depicts external work granules of an execution plan executed by a DBMS and distributed data access system according to an embodiment of the present invention.
Figure 2B:
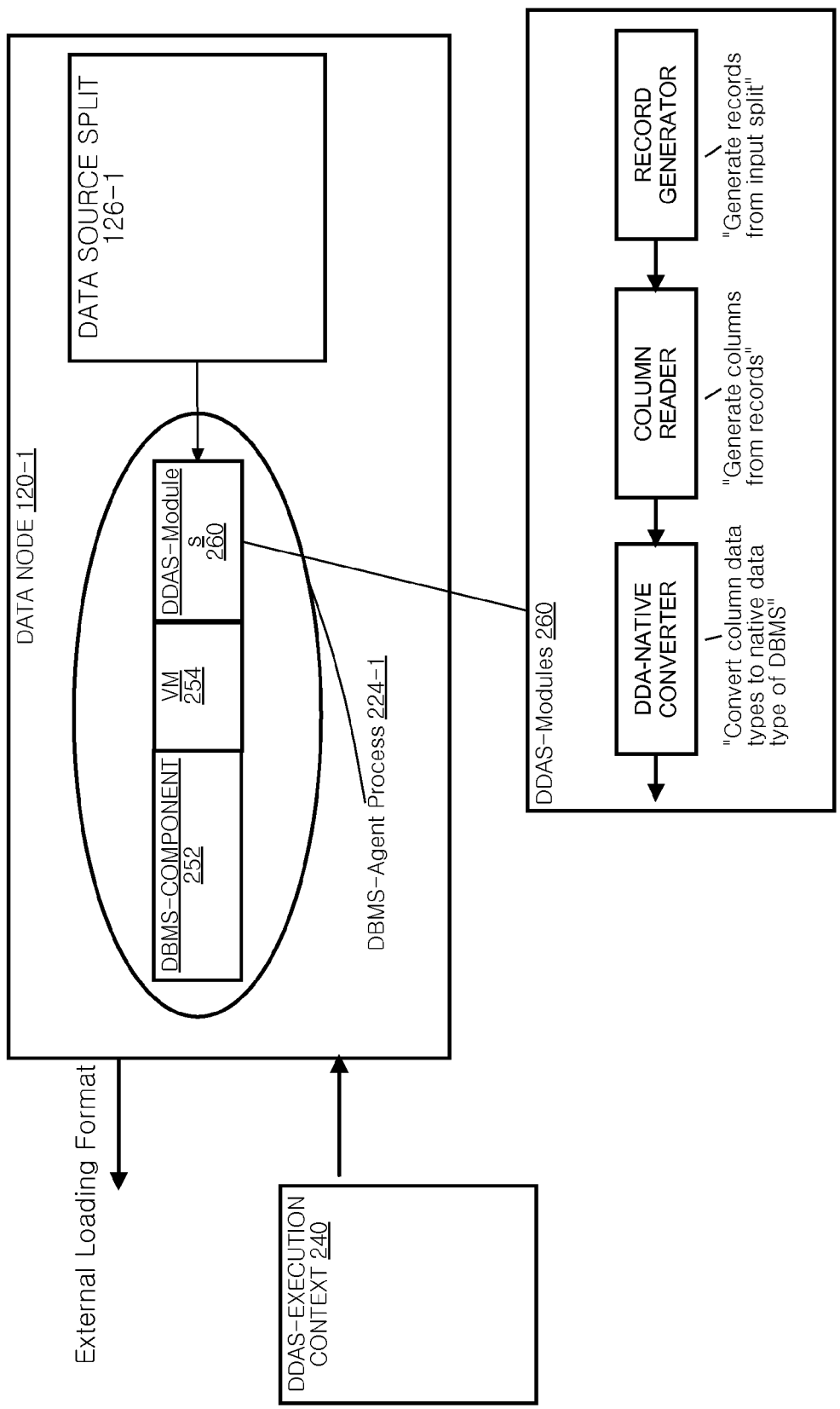
FIG. 2B is a diagram that depicts elements used on a data node executing external work granules according to an embodiment of the present invention.

Other phases include the Describe-Time phase, which is performed when compiling a query, and the External-Granule-Execution phase, which is performed when executing an execution plan for the query. To describe details of the External Table Registration phase, Describe-Time phase, and External-Granule-Execution phase, it is useful to describe some of the elements that are used and/or generated by a DBMS and/or distributed data access system during execution of a query, and in particular, during the External-Granule-Execution phase. FIGS. 2A and 2B describe such elements.

Referring to FIG. 2A, FIG. 2A depicts an execution plan 204. The work granules generated for execution plan 204 include external work granules. An external work granule in execution plan 204 generates rows from an input split and is executed not only by a slave process running within a DBMS but also by at least a process running on a data node, the process on the data node working in tandem with the slave process to generate rows, as shall be described in greater detail. A process that is running on a data node and that is working in tandem with a slave process in the DBMS to generate rows from an input split is referred to herein as a DBMS-agent process.

Referring to FIG. 2A, FIG. 2A depicts execution plan 204, which may be executed by DBMS 102 to execute a query. Execution plan 204 defines, among other work granules, External Work Granule 204-1, External Work Granule 204-2, External Work Granule 204-3, External Work Granule 204-4, External Work Granule 204-5, and External Work Granule 204-6.

During execution of execution plan 204 during the External-Granule-Execution phase, each of the external work granules is assigned to either Slave Process 202-1 or slave process 202-2. In general, a work granule at a time is assigned to one slave process. When execution of an external work granule is completed by a slave process, another work granule is assigned to the slave process if any unassigned work granule is available. Alternatively, a slave process may be assigned multiple work granules at time. As depicted in FIG. 2A, External Work Granule 204-1, External Work Granule 204-2, and External Work Granule 204-3 are assigned to Slave Process 202-1 and External Work Granule 204-4, External Work Granule 204-5, and External Work Granule 204-6 are assigned Slave Process 202-2.

When assigned an external work granule, a slave process works in tandem with a DBMS-agent process running on a data node of Distributed Data Access System 104 to generate rows from an input split defined for the external work granule. If a slave process is currently assigned multiple work granules, a slave process concurrently works in tandem with multiple DBMS-agent processes.

Referring to FIG. 2A, DBMS-Agent process 260-1, DBMS-Agent process 260-2, DBMS-Agent process 260-3, DBMS-Agent process 260-4, DBMS-Agent process 260-5, and DBMS-Agent process 260-6 are DBMS-agent processes running on Distributed Data Access System 104. Working in tandem with Slave Process 202-1, DBMS-Agent process 260-1, DBMS-Agent process 260-2, and DBMS-Agent process 260-3 generate rows from a respective input split for External Work Granule 204-1, External Work Granule 204-2, and External Work Granule 204-3. Working in tandem with Slave Process 202-2, DBMS-Agent process 260-4, DBMS-Agent process 260-5, and DBMS-Agent process 260-6 generate rows from a respective input split for External Work Granule 204-4, External Work Granule 204-5, and External Work Granule 204-6.

More Data-Node Side Elements

FIG. 2B depicts various elements used on Data Node 120 during the External-Granule-Execution phase. These elements are exemplary of elements used on other data nodes in Distributed Data Access System 104 during the External-Granule-Execution phase. Referring to FIG. 2B, DBMS-Agent Process 202 is connected to a slave process DBMS 102. DBMS-Agent Process 202 performs services and functions related to generating rows for DBMS 102 for an input split. These services and functions are implemented through various software components. These components include DBMS-Modules 252, VM (Virtual Machine) 254, and DDAS-Modules 260.

DDAS-Modules 260 are executed by a DBMS-agent process to generate rows from an input split for an external table. DDAS-Modules 260 are developed in accordance with the aforementioned DDAS API. Distributed Data Access System 104 may store different types of data sources; a different set of DDAS-modules may be developed to handle each different type of data source. According to an embodiment, DDAS-Modules 260 contain three different categories of modules.

Record Reader—A record reader generates records from a type of data source or a specific data source. For example, different Record Readers may be used for different file types.

Column Reader—A column reader generates column values for records generated by a record reader. Different column readers may be developed for different types of data sources. The column values generated conform to a DDAS column data type.

DDAS-Native Converter—A DDAS-Native converter converts the data type of column values in records generated by a column reader to rows having a row format with column values having DBMS column data types. According to an embodiment, the row format and DBMS column data types is an "external-loading format", used by DBMS 102 for loading (or in other words, importing) external data for external tables, as shall be described later in further detail.

For example, a data source may be a file containing data formatted in comma-separated value format, which is a format where fields are separated by a comma character and records are lines separated by an end-of-line character. A record reader configured for this type of file generates a record for each line. A column reader reads each record generated by the record reader and generates column values that conform to a DDAS column data type within each record. A DDAS-Native converter converts records and column values contained therein into rows that conform to the external-loading format, the rows having column values that conform to a DBMS column data type.

As another example, another type of data source may be a file that contains JSON objects. A record reader generates a record for each JSON object. For each record generated, a column generator generates the column values that conform to a DDAS column data type. A DDAS-Native converter converts records containing the column values conforming to DDAS column data types to rows with column values conforming to an external-loading format of DBMS 102.

According to an embodiment, DDAS-Modules 260 are executed by a virtual machine, such as VM 254. For example, DDAS-modules maybe Java™ classes that are executed by a Java virtual machine.

DBMS-Component 252 serves as an interface between data nodes and slave processes executing work granules on DBMS 102 to retrieve rows for an input split from a data node. DBMS-Component 252 returns the rows to DBMS 102 using protocols and formats supported by DBMS 102 for receiving rows generated for work granules. DBMS-Component 252 also causes execution of the DDAS-modules that are needed to generate rows from a particular data source. For example, the particular record reader, column reader and DDAS-native converter needed to generate rows for a particular data source are implemented by Java classes. DBMS-Component 252 causes VM 254 to execute these Java classes to generate the rows for a particular file split of a file.

DDAS-Execution Context 240 describes how a DBMS-agent is to execute an external work granule. Specifically, DDAS-execution context 240 specifies an input split for a data node and the DDAS-Modules 260 that a DBMS-agent process should execute to generate rows from an input split. DDAS-execution context 240 is generated during the Describe-Time phase and passed to a DBMS-agent process during the Query-Run-Time phase.

Parallelized-External-Table Access Phases

Figure 3:
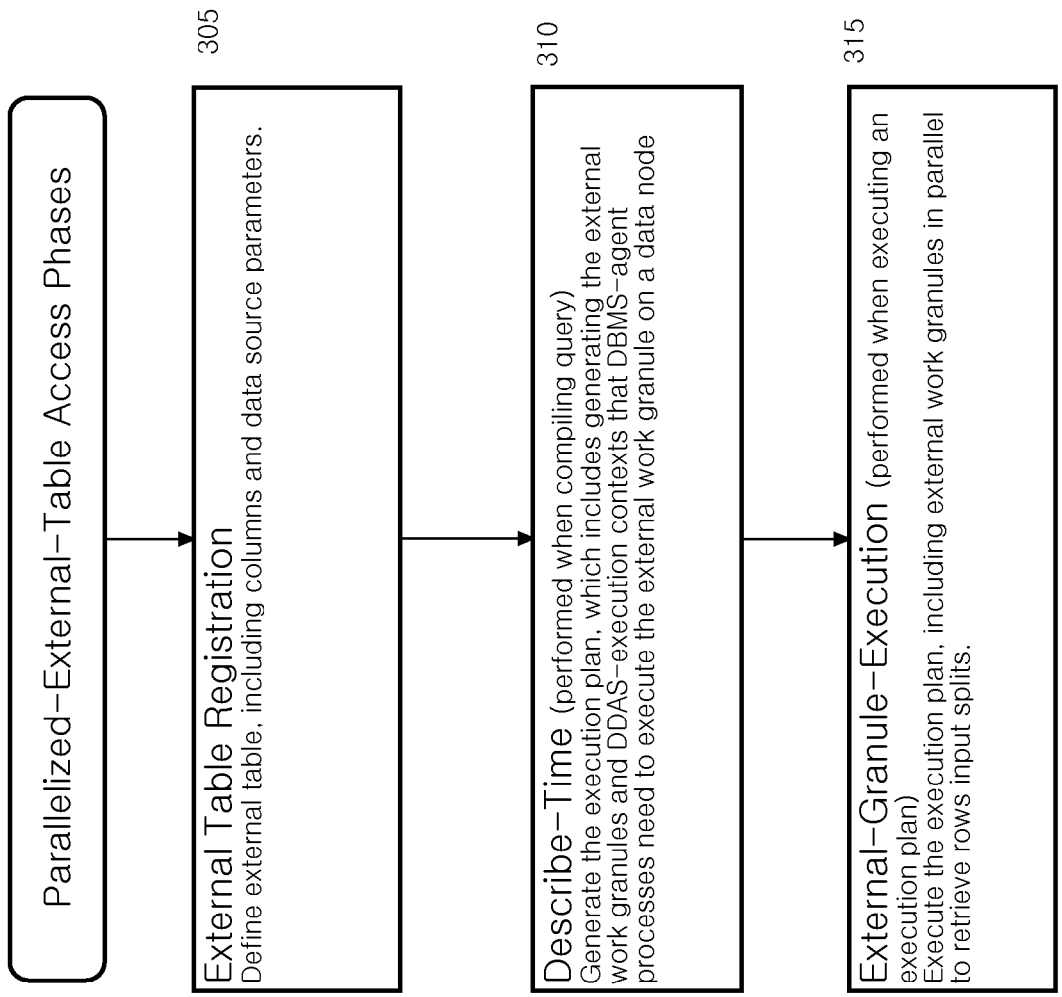
FIG. 3 is a flow chart depicting phases of parallelized-external-table access according to an embodiment of the present invention.

As mentioned before, using parallelized-external-table access entails three phases: the External Table Registration phase, the Describe-Time phase, and the External-Granule-Execution phase. FIG. 3 is a flow chart depicting these phases. Each phase is summarized below, and then explained in greater detail in following sections.

In External Table Registration 305, an external table is defined by DBMS 102 in response to receiving one or more DDL statements. Defining an external table entails defining columns of the external table and data source parameters that specify how to retrieve rows from a distributed Data Access System 104 for the external table.

Describe-Time phase 310 is performed when compiling a query and includes aspects of compiling a query that are specific for parallelized-external-table access. These aspects include generating the external work granules for an execution plan and DDAS-execution contexts that a DBMS-agent process needs to execute the external work granule on a data node.

In External-Granule-Execution phase 315, the external work granules of an execution plan are executed. For a slave process executing an external work granule, the slave process interacts with a DBMS-agent process on a data node to cause the DBMS-agent process to execute its portion of an external work granule, which includes retrieving rows in the way specified by a DDAS-execution context. The DDAS-execution context is passed to the DBMS-agent process by the slave process.

Compiling and executing a database statement under parallelized-external-table access not only involves aspects that are specific to parallelized-external-table access but aspects more generally applicable to executing a query database statement. For example, execution of a query database statement under parallelized-external-table access not only includes executing plan operations that are specific to parallelized-external-table access but also more generally applicable plan operations. Such more generally applicable plan operations include scanning and filtering rows from tables spaces of native database tables, filtering rows retrieved for an external table, join operations, sort operations, and aggregation operations. For purposes of exposition of parallelized-external-table access, more generally applicable aspects of compiling and executing a database statement are not described in as great as detail as those aspects specific to parallelized-external-table access.

External Table Registration Phase

In this phase, an external table is defined by DBMS 102, which DBMS 102 may do in response to receiving a DDL statement, such as the illustrative DDL statement described below. Defining an external table includes generating metadata in a database dictionary describing the various properties of the external table. These properties include a table name, columns and the column names and data types of the column, and other parameters specified in a DDL statement.

Referring to FIG. 4, FIG. 4 depicts DDL statement 401. DDL statement 401 is a DDL statement declaring an external table customer_address. DDL statement 401 specifies four columns and the data types thereof, which are ca_customer_Id as a number data type, and ca_street_number, ca_state, ca_zip as character data types.

The EXTERNAL clause within the ORGANIZATION clause specifies that table customer_address is an external table. The EXTERNAL clause includes various other clauses.

The TYPE clause specifies an external table type. The external table type dictates what data source properties need to be specified in the DDL statement. In an embodiment, any one of several external file types may be specified for an external table. These types include DDAS_TABLE and DDAS_FILE.

DDAS_TABLE is the external table type specified by DDL statement 401. For an external table of the type DDAS_TABLE, the DDAS-modules and various details of the data source, are provided by the definition of a DDAS table in database dictionary 157 in Distributed Data Access System 104.

The ACCESS PARAMETERS clause specifies parameters that govern aspects of the Describe-Time and External-Granule Execution phases. In DDL statement 401, the ACCESS PARAMETERS include the parameter DDAS: which specifies the distributed data access system at which the data source for the external table may be accessed, which is Distributed Data Access System 104.

The LOCATION clause specifies a data source identifier to identify the data source of an external table within the distributed data access system specified that is specified by the ACCESS PARAMETERS clause. When the external table type is DDAS_TABLE, the data source identifier of the LOCATION clause identifies a DDAS table name.

Parallelized-external-table access is hereafter initially described in the context of the DDAS_TABLE external table type. Afterwards, parallelized-external-table access is described in the context of external table type DDAS_FILE.

As shall be explained in greater detail, during the describe-time phase, a mapping is generated between DBMS table columns and the DDAS table columns. By default, a DBMS table column is mapped to a DDAS table column having the same name. However, the default may be overridden by providing a specific mapping for a DBMS table column in the DDL statement defining the external table. In DDL statement 401, the parameter colmap: maps DBMS table column "ca_zip" to the DDAT table column "postal_code".

Describe-Time Phase

The Describe-Time phase is performed when compiling an external-table query. When compiling a query that references an external-table query, the query is parsed; the parsing may include identifying an external table referenced by the query.

As mentioned previously, an embodiment of the present invention is initially illustrated using external table type DDAS_TABLE, which is an external table having a data source specified with reference to a DDAS table. Thus, the Describe-Time phase is initially described in the context of compiling a query requiring access to an external table having an external table type of DDAS_TABLE; the DDAS table is stored in a file stored in Distributed Data Access System 104.

FIG. 5 depicts operations performed during the Describe-Time phase. Referring to FIG. 5, at 505, DBMS 102 transmits a request for a "data source profile", the request identifying the data source. The data source profile is information about a data source that is used to generate external work granules and DDAS-execution contexts during query compilation. At 510, Distributed Data Access System 104 receives the requests and generates Data Source Profile 550.

How the requested data source is identified by the request depends on the external table type of the external table for which the request is generated. In the current illustration, the external table type is DDAS_TABLE; thus the identified data source is a DDAS table.

According to an embodiment, Data Source Profile 550 specifies the record reader, column reader, DDAS-Native Converter, the data source and the input splits. In addition, Data Source Profile 550 includes the DDAS table columns list and the respective DDAS column data type of each DDAS table column in the list.

According to an embodiment, DBMS 102 transmits the request for a data source profile to Name Node 150, the request identifying the DDAS table. In response, Name Node 150 retrieves metadata from database dictionary 157 for the DDAS table. The metadata identifies the record reader and column reader for the DDAS table, the DDAS table columns list and respective data types of each, and the data source and input splits for the data source. In the current illustration, the data source is a file storing data for the requested DDAS table. Based on the metadata retrieved, Name Node 150 generates Data Source Profile 550 and returns the Data Source Profile 550 to DBMS 102.

In an embodiment, DBMS 102 transmits the request for a data source profile to any data node in Distributed Data Access System 104, the request identifying the DDAS table. In response, the data node retrieves metadata from database dictionary 157 for the DDAS table. Based on the metadata, the data node generates Data Source Profile 550 and returns Data Source Profile 550 to DBMS 102.

Once DBMS 102 receives the data source profile, at 520, DBMS 102 generates a DBMS-DDAS column mapping, external-table granules and a DDAS-execution context for each of the external-table granules.

The DBMS-DDAS column mapping maps each DBMS table column of the external table and its DBMS column data type to a respective DDAS table column and its DDAS column data type. By default, the mapping is based on name matching; a DBMS table column is mapped to the DDAS table column of the same name. If a DBMS table column is explicitly mapped to a DDAS table column by the definition of the external table (by for example, a COLMAP: parameter), then the DBMS-DDAS column mapping maps that DBMS table column to the DDAS table column.

According to an embodiment, an external work granule and respective DDAS-execution context is generated by DBMS 102 for each input split, such as External Work Granule 560 and DDAS-execution context 565.

DDAS-execution context 565 specifies a record reader, column reader, DDAS-Native Converter, a data source, an input split, and DBMS-DDAS column mapping.

External-Granule-Execution Phase

Figure 6B:
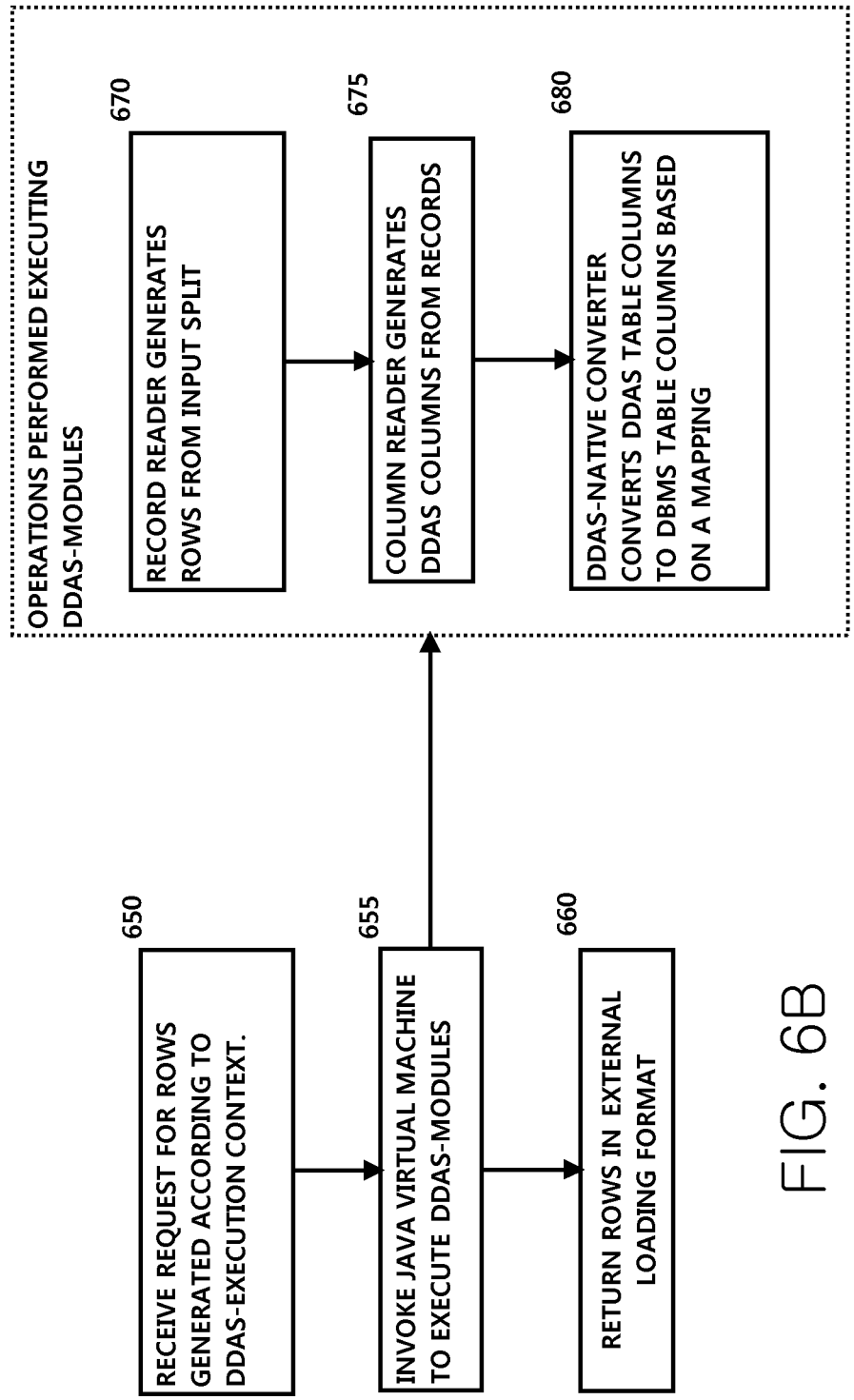
FIG. 6B is a flowchart depicting operations performed by a distributed data access system to execute external work granules under parallelized-external-table access according to an embodiment of the present invention.

FIGS. 6A and 6B depict procedures performed during the External-Granule-Execution phase. FIG. 6A depicts operations performed by DBMS 102 during the External-Granule- Execution phase. FIG. 6B depicts operations performed by Distributed Data Access System 104 during the External-Granule-Execution.

As mentioned before, the External-Granule-Execution phase comprises executing external work granules that are part of an execution plan that comprises a larger set of work granules and plan operations being executed by a set of slave processes. FIG. 6A depicts operations performed during the External-Granule-Execution phase and not other plan operations of the execution plan.

During the External-Granule-Execution phase, each slave process of a set of slave processes is assigned an external work granule. Thus, multiple slave processes may each be concurrently executing a separate external work granule. When a slave process completes execution of an external work granule, another unexecuted external work granule is assigned to and executed by the slave process.

Referring to FIG. 6A, at 605, an available slave process that is not executing an external work granule is assigned an unassigned external work granule that has not been executed.

Operations 610-620 are operations performed by a slave process assigned an external work granule. At 610, the slave process sends a request to a DBMS-agent process on the data node specified by the input split of the DDAS-execution context for the external work granule. The slave process sends the DDAS-execution context with the request.

At 615, the slave process receives the rows in an external-loading format and stores the rows. The rows may be stored in a buffer to be further processed by another execution plan operation. For example, the execution plan may include a filtering plan operation for filtering rows from an external table based on a column predicate. A slave process executing a work granule for the plan operation may access the rows in the buffer to filter the rows based on the column predicate.

At 620, the slave process, after completing the external work granule, becomes available for assignment of another external work granule.

Data-Node Side

FIG. 6B depicts operations performed by a Distributed Data Access System 104 in response to receiving a request for rows from a slave process executing an external work granule. The operations are performed by execution of DB-COMPONENT 252 by a DBMS-agent process.

Referring to FIG. 6B, at 650, the DBMS-agent process receives the request to generate rows according to a DDAS-execution context for an external work granule. A DDAS-execution context is sent along with the request.

At 655, a DBMS-agent process invokes a virtual machine to execute the DDAS modules specified in the DDAS-execution context. The virtual machine may be executed by the DBMS-agent process or by another process running on the data node. Operations 670, 675, and 680 are operations executed by execution of DDAS modules.

At 670, the record reader generates records from the input split specified in the DDAS-execution context 240.

At 675, the column reader generates DDAS table columns for the records generated by the record reader.

At 680, the DDAS-Native converter converts the DDAS table columns in the records to rows with DBMS table columns formatted in the external-loading format. The conversion requires a mapping between the DDAS table columns and DBMS table columns. The values in each DDAS table column are converted into values for the DBMS table column mapped to the DDAS table column; the conversion may entail changing the data type values for a DBMS table column from a DDAS column data type to a DBMS column data type.

According to an embodiment, for an external-loading format, the row format separates rows using delimiters. Each DBMS column value in a row is represented by length-value pairs and has a DBMS column data type. The order of column length-value pair is in the order the DBMS 102 expects for the external table.

External Table Type

As mentioned earlier, another external table type is DDAS_FILE. For this external data type, the external table definition of the external table specifies an external file, instead of a DDAS table, as the data source, and specifies the DDAS-Modules to execute to generate rows from the file. Other aspects of parallelized-external-table access differ as well.

FIG. 7 depicts DDL statement 701, a DDL statement used to define an external table of the external table type DDAS_FILE. Referring to FIG. 7, DDL statement 701 declares an external table shipping_address. DDL statement 701 specifies four columns and the data types thereof, which are sh_customer_Id as a number data type, and sh_street_number, sh_state, and sh_zip as character data types.

The EXTERNAL clause within the ORGANIZATION clause specifies that table shipping_address is an external table. The TYPE clause specifies the external table type DDAS_FILE.

ACCESS PARAMETERS include the parameter DDAS: which specifies DDAS_104 for the distributed data access system that stores the external file, which is Distributed Data Access System 104.

Parameter COLUMN_READER identifies the column reader DDAS_104.ext_tab_lib.ShASer. Parameter RECORD_READER identifies a record reader DDAS_104.ext_tab_lib.ShAOutput. Parameter DDAS_NATIVE_CONVERTER identifies a native converter DDAS_104.ext_tab_lib.ORA_ELF.

The LOCATION clause specifies the data source as external table 'DDAS:/DDAS_104'/shippingAddresses.json' within Distributed Data Access System 104.

The DDAS-Modules specified in DDL statement 701 may be customized by developers to generate rows from specific data sources or types of data sources. For example, the external file 'DDAS:/DDAS_104'/'shippingAddresses.json' may contain JSON objects, each specifying a shipping address. The record reader DDAS_104.ext_tab_lib.ShAOutput generates a record for each JSON object. For each such record, the column reader DDAS_104.ext_tab_lib.ShASer generates a record with column values corresponding to the attribute values of the JSON object. All the column values have a string DDAS column type.

The DDAS_NATIVE_CONVERTER DDAS_104.ext_tab_lib.ORA_ELF converts records and column values therein to the external-loading format. This DDAS-Native converter is not developed specifically for the JSON objects but is a more a generally applicable module. The DDAS_NATIVE_CONVERTER DDAS_104.ext_tab_lib.ORA_ELF expects a column order associated with columns of the external table to coincide with the column order of the columns in the records generated by the column reader. DDAS-Native converter uses a DBMS table column list provided in a DDAS-execution context, which specifies the DBMS column data type of each and reflects the order of columns in the external table. For each column in a record generated by a column reader, the DDAS-Native converter converts the string value in the column to a value of the DBMS column data type of the DBMS table column having the corresponding column order, according to the DBMS table column list.

The metadata generated in the database dictionary of DBMS 102 includes different content for external table type DDAS_FILE. For example, the metadata specifies a record reader, column reader, DDAS-Native converter, and an external file.

Various aspects of the Describe-Time phase differ as well. During the Describe-Time phase, when DBMS 102 requests a data source profile, the request identifies a file as the data source. The data source profile specifies input splits for the file but does not include information such as DDAS table column lists, and does not include information that identifies a recorder reader, column reader, and DDAS-Native converter, since these DDAS-modules are supplied by the DBMS for the external table.

The content of the DDAS-execution contexts differs too. A DBMS-DDAS columns list is not provided because the data source identified is a file rather than a DDAS table. Instead, DBMS table column list may be provided in the DDAS-execution context, if needed to enable or otherwise facilitate rows in external-loading format.

Composite Data Source

A DDAS table may be stored in a composite data source, which comprises multiple data sources referred to herein as constituent data sources. The constituent data sources may have a different format and/or type, each of which may require different DDAS-modules to process.

During the Describe-Time phase, the data source profile provides information specific to each composite data source. For each composite data source, the data source profile may specify different DDAS-modules. A DDAS-execution context identifies the DDAS-modules specified by the Data source profile for the respective composite data source. Thus, DDAS-execution contexts may identify different DDAS modules.

DBMS Overview

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMS's, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database, as well as other kinds of operations. A database command may be in the form of a database statement that conforms to a database language. A database language for expressing the database commands is the Structured Query Language (SQL). There are many different versions of SQL, some versions are standard and some proprietary, and there are a variety of extensions. Data definition language commands are issued to a database server to create or configure database objects, such as tables, views, or complex data types. DDL commands are used to configure a database server for a particular hardware environment, to configure computer resource usage of the database server, as well as other operating aspects of the database server.

A multi-node database management system is made up of interconnected nodes that share access to the same database or databases. Typically, the nodes are database server hosts interconnected via a network and share access, in varying degrees, to shared storage, e.g. shared access to a set of disk drives and data blocks stored thereon. Each node in a multi-node database system hosts a database server. A server, such as a database server, is a combination of software and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to as a "server instance" or "instance". A database server may comprise multiple database instances, some or all of which are running on separate computers, including separate server blades.

The term process refers to a computer system process, which is described below in the HARDWARE OVERVIEW. Processes that comprise a database server run under the control of the database server (i.e. can be created or terminated by the database server) and perform various database server functions. Such processes are referred to herein as database server processes. Database server processors include listeners, garbage collectors, log writers, "server processes" for database sessions for executing database commands issued by database clients (including processes executing within shared sessions), and recovery processes.

In addition, further details of processing external tables, parallelized-external-table access may be found in the following documents in this paragraph. All the following documents in this paragraph are incorporated herein by reference: Oracle® Big Data Appliance, Software User's Guide, Release 4 (4.0), E55814-03; and U.S. patent application Ser. No. 13/866,866, "Caching External Data Sources For SQL Processing", filed by Atif Chaudry, et al. on Apr. 19, 2013.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
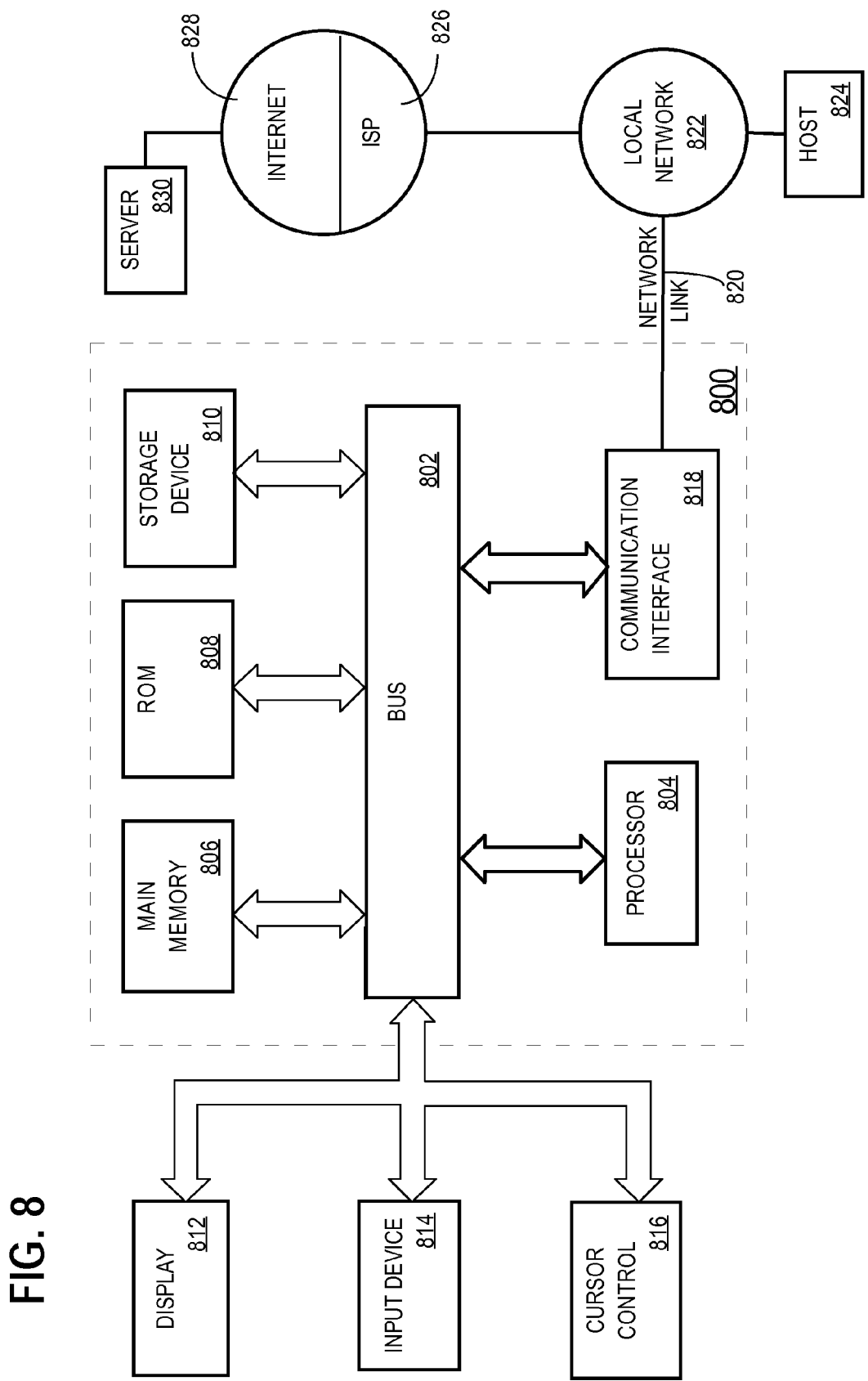
FIG. 8 is a diagram depicting a computer system that may be used to implement an embodiment of the present invention.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. A computer system process comprises an allotment of processor time, and an allotment of memory (physical and/or virtual), the allotment of memory being for storing instructions executed by the processor, for storing data generated by the processor executing the instructions, and/or for storing the processor state (e.g. content of registers) between allotments of the processor time when the computer system process is not running. Computer system processes run under the control of an operating system, and may run under the control of other programs being executed on the computer system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

A computer system process comprises an allotment of processor time, and an allotment of memory (physical and/or virtual), the allotment of memory being for storing instructions executed by the processor, for storing data generated by the processor executing the instructions, and/or for storing the processor state (e.g. content of registers) between allotments of the processor time when the computer system process is not running. Computer system processes run under the control of an operating system, and may run under the control of other programs being executed on the computer system.

In the specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   a DBMS generating an execution plan for a query that requires access to an external table, wherein data for said external table is stored in a data source accessible on a distributed data access system comprising a plurality of data nodes, wherein generating said execution plan includes:
      sending to said distributed data access system a request for a data source profile of said data source;
      receiving said data source profile, said data source profile specifying a plurality of input splits for the data source, each input split of said plurality of input splits corresponding to a respective data node and a respective portion of said data source;
      based on the data source profile, generating a plurality of external work granules for generating rows from said data source;
      each external work granule of said plurality of work granules being for generating respective rows from a respective input split of said plurality of input splits;
   said DBMS executing said execution plan, wherein executing said execution plan comprises for each slave process of a plurality of slave processes:
      assigning a particular work granule of said plurality of external work granules to said each slave process;
      said each slave process sending a request to the data node corresponding to the respective input split of said particular external work granule, said request requesting the respective rows for said respective input split;
   in response to sending a request to the data node corresponding to the respective input split, said each slave process receiving the respective rows from the data node corresponding to the respective input split.

2. The method of claim 1, wherein for each slave process of a plurality of slave processes, said each slave process sending a request to the respective data node corresponding to the respective input split of said particular external work granule includes sending a request that identifies code modules to be executed by the respective data node to generate the respective rows.

3. The method of claim 1,
   wherein said data source profile identifies code modules; and
   wherein for each slave process of a plurality of slave processes, said each slave process sending a request to the respective data node corresponding to the respective input split of said particular external work granule includes sending a request that identifies code modules to be executed by the respective data node to generate the respective rows.

4. The method of claim 1,
   wherein said data source profile identifies code modules; and
   wherein for each slave process of a plurality of slave processes, said each slave process sending a request to the respective data node corresponding to the respective input split of said particular external work granule includes sending a request that identifies code modules to be executed by the respective data node to generate the respective rows;
   wherein said code modules comprise:
      one or more record reader modules for generating records from said data source; and
      one or more column reader modules for generating column values from records generated by said one or more record reader modules.

5. The method of claim 1, wherein for each slave process of a plurality of slave processes, said each slave process receiving the respective rows from the data node corresponding to the respective input split includes receiving the respective rows in a row format supported by said DBMS.

6. The method of claim 1, wherein:
   said request for a data source profile of said data source identifies a particular table as said data source, said particular table being defined by said distributed data access system.

7. The method of claim 6, wherein:
   said data source profile specifies a plurality of particular columns of said particular table, wherein each particular column of said plurality of particular columns has a particular column data type of a plurality of particular column data types supported by said distributed data access system;
   wherein said generating said execution plan includes generating a mapping that maps each external table column of said external table and a respective DBMS column data type of said each external table column to a particular column of said plurality of particular columns and the respective particular column data type of said particular column;
   wherein for each slave process of a plurality of slave processes, said each slave process sending a request to the respective data node corresponding to the respective input split of said particular external work granule includes sending a request that:
      identifies code modules to be executed by the respective data node to generate the respective rows,
      specifies said mapping, and wherein said code modules include:
one or more modules that generate rows having particular column values for the plurality of particular columns;
one or more modules that:
based on the mapping, perform a conversion of particular column values for the plurality of particular columns to external table column values having a DBMS column data type,
based on the conversion, generating rows in a row format supported by said DBMS for loading rows for said external table.

8. A non-transitory computer-readable medium storing sequences of one or more instructions, said sequences of one or more instructions, when executed by one or more processors, cause:
a DBMS generating an execution plan for a query that requires access to an external table, wherein data for said external table is stored in a data source accessible on a distributed data access system comprising a plurality of data nodes, wherein generating said execution plan includes:
sending to said distributed data access system a request for a data source profile of said data source;
receiving said data source profile, said data source profile specifying a plurality of input splits for the data source, each input split of said plurality of input splits corresponding to a respective data node and a respective portion of said data source;
based on the data source profile, generating a plurality of external work granules for generating rows from said data source;
each external work granule of said plurality of work granules being for generating respective rows from a respective input split of said plurality of input splits;
said DBMS executing said execution plan, wherein executing said execution plan comprises for each slave process of a plurality of slave processes:
assigning a particular work granule of said plurality of external work granules to said each slave process;
said each slave process sending a request to the data node corresponding to the respective input split of said particular external work granule, said request requesting the respective rows for said respective input split;
in response to sending a request to the data node corresponding to the respective input split, said each slave process receiving the respective rows from the data node corresponding to the respective input split.

9. The non-transitory computer-readable medium of claim 8, wherein for each slave process of a plurality of slave processes, said each slave process sending a request to the respective data node corresponding to the respective input split of said particular external work granule includes sending a request that identifies code modules to be executed by the respective data node to generate the respective rows.

10. The non-transitory computer-readable medium of claim 9, wherein said data source profile identifies said code modules.

11. The non-transitory computer-readable medium of claim 9, wherein said code modules comprise:
wherein said data source profile identifies code modules; and
wherein for each slave process of a plurality of slave processes, said each slave process sending a request to the respective data node corresponding to the respective input split of said particular external work granule includes sending a request that identifies code modules to be executed by the respective data node to generate the respective rows;
wherein said code modules comprise:
one or more record reader modules for generating records from said data source; and
one or more column reader modules for generating column values from records generated by said one or more record reader modules.

12. The non-transitory computer-readable medium of claim 8, wherein for each slave process of a plurality of slave processes, said each slave process receiving the respective rows from the data node corresponding to the respective input split includes receiving the respective rows in a row format supported by said DBMS.

13. The non-transitory computer-readable medium of claim 8, wherein:
said request for a data source profile of said data source identifies a particular table as said data source, said particular table being defined by said distributed data access system.

14. The non-transitory computer-readable medium of claim 13, wherein:
said data source profile specifies a plurality of particular columns of said particular table, wherein each particular column of said plurality of particular columns has a particular column data type of a plurality of particular column data types supported by said distributed data access system;
wherein said generating said execution plan includes generating a mapping that maps each external table column of said external table and a respective DBMS column data type of said each external table column to a particular column of said plurality of particular columns and the respective particular column data type of said particular column;
wherein for each slave process of a plurality of slave processes, said each slave process sending a request to the respective data node corresponding to the respective input split of said particular external work granule includes sending a request that:
identifies code modules to be executed by the respective data node to generate the respective rows,
specifies said mapping, and
wherein said code modules include:
one or more modules that generate rows having particular column values for the plurality of particular columns;
one or more modules that:
based on the mapping, perform a conversion of particular column values for the plurality of particular columns to external table column values having a DBMS column data type,
based on the conversion, generating rows in a row format supported by said DBMS for loading rows for said external table.

* * * * *

UNITED STATES PATENT AND TRADEMARK OFFICE
CERTIFICATE OF CORRECTION

PATENT NO. : 10,019,473 B2
APPLICATION NO. : 14/685840
DATED : July 10, 2018
INVENTOR(S) : McClary et al.

Page 1 of 1

It is certified that error appears in the above-identified patent and that said Letters Patent is hereby corrected as shown below:

In the Specification

In Column 2, Line 8, delete "Parallizing" and insert -- Parallelizing --, therefor.

Signed and Sealed this
Ninth Day of April, 2019

Andrei Iancu
*Director of the United States Patent and Trademark Office*